No. 739,936. PATENTED SEPT. 29, 1903.
J. T. SMITH.
ARTIFICIAL FUEL.
APPLICATION FILED JAN. 23, 1903.
NO MODEL. 2 SHEETS—SHEET 1.
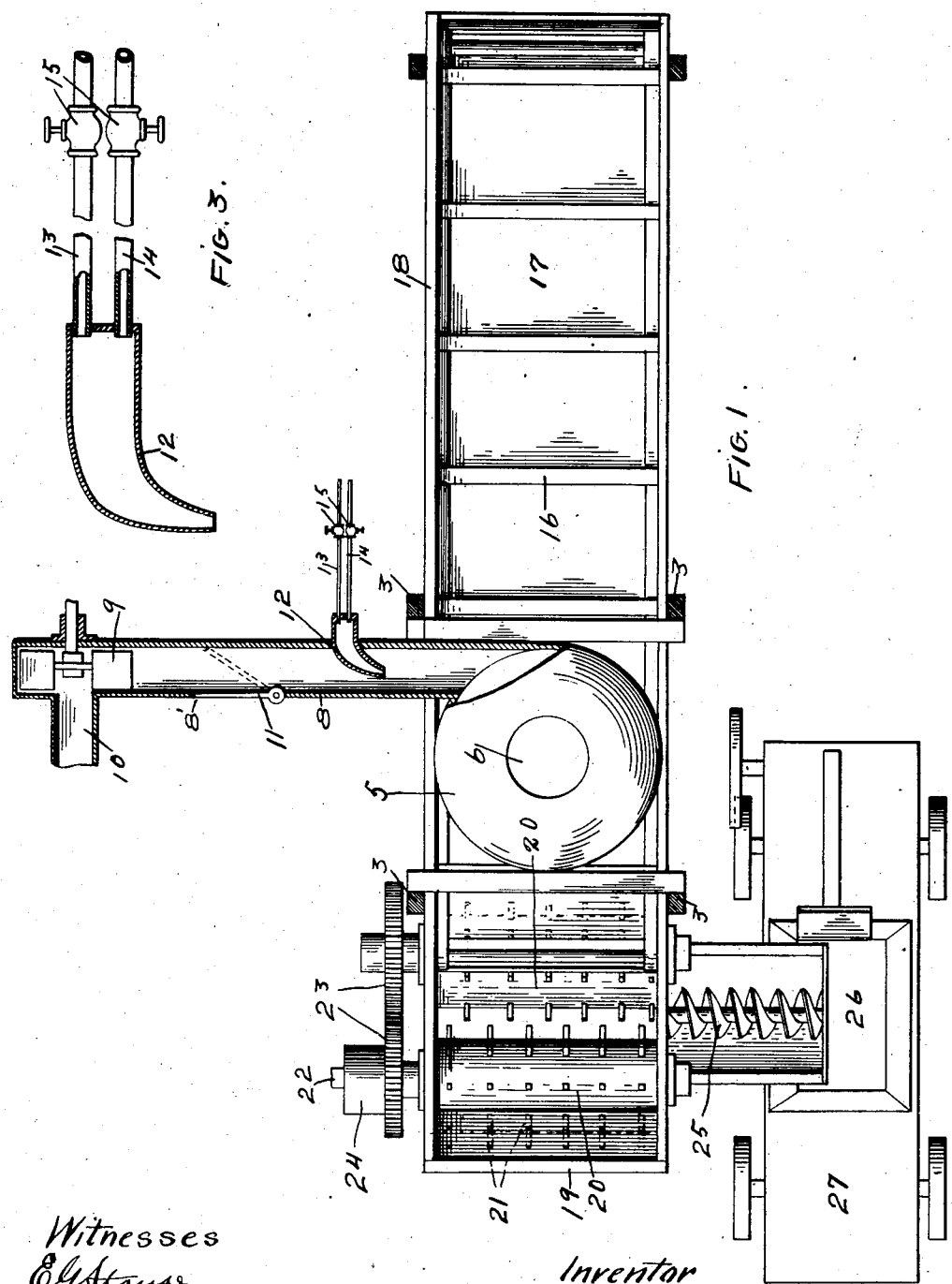
Witnesses
Inventor
John T. Smith
By his attorneys

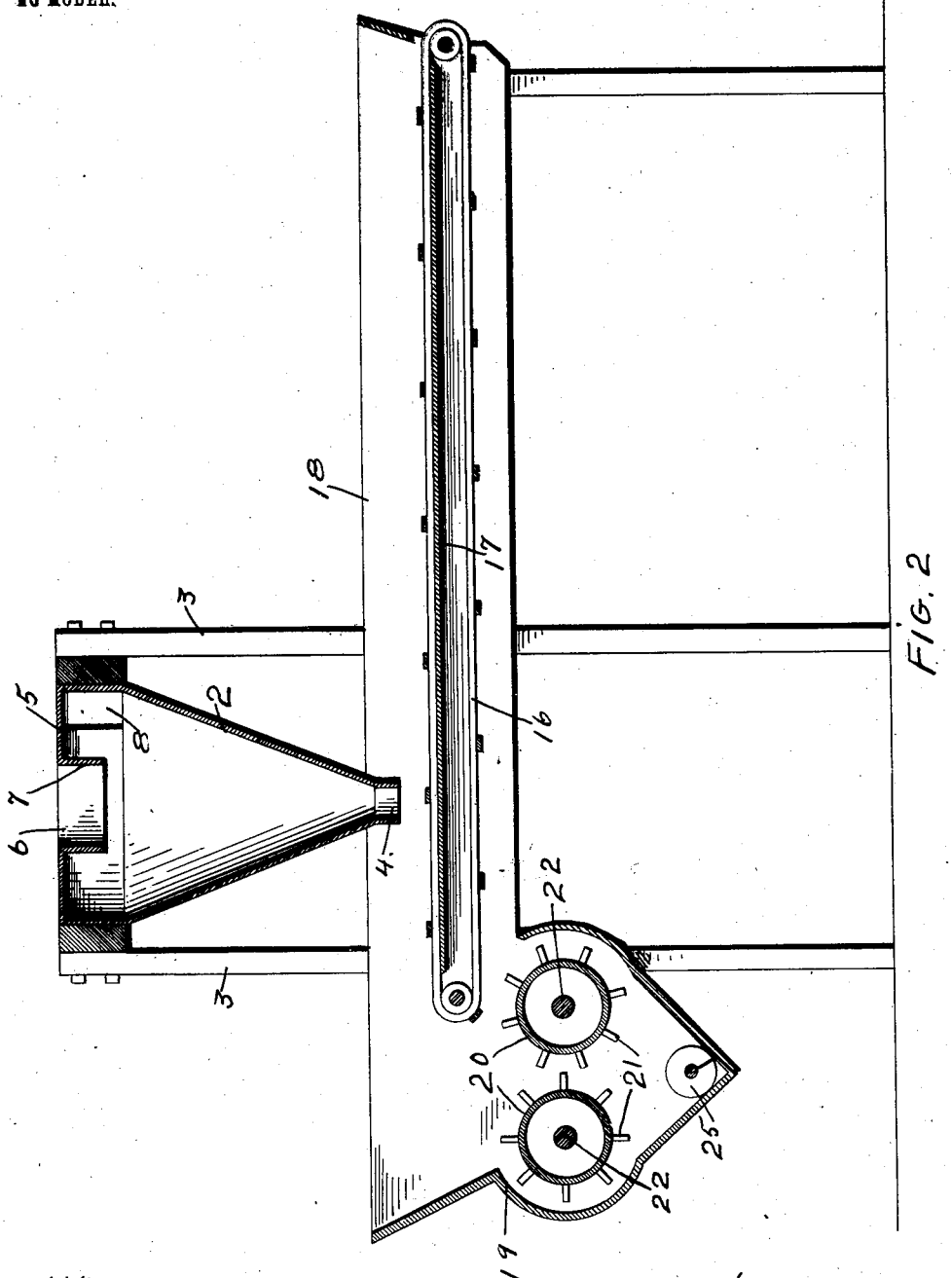

No. 739,936. Patented September 29, 1903.

UNITED STATES PATENT OFFICE.

JOHN T. SMITH, OF HERON LAKE, MINNESOTA.

ARTIFICIAL FUEL.

SPECIFICATION forming part of Letters Patent No. 739,936, dated September 29, 1903.

Application filed January 23, 1903. Serial No. 140,246. (No specimens.)

*To all whom it may concern:*

Be it known that I, JOHN T. SMITH, of Heron Lake, county of Jackson, State of Minnesota, have invented certain new and useful Improvements in Artificial Fuel, of which the following is a specification.

The invention relates to a process of treating the waste material, such as sawdust, of woodworking machinery and the refuse of grain-threshers and flax breaks and mills; and the particular object of the invention is to provide a process for converting the shives, woody portions of flax fiber, and other refuse of a flax-mill into a compact, convenient, and economical form for use as fuel for steaming or domestic purposes.

My process for treating vegetable or woody fiber consists in subjecting the same while in motion within a receptacle to the action of a moistening cohesive agent and then compressing the material so treated upon its discharge from said receptacle.

A further step in the process consists in the admixture of a suitable binder following the dampening step of the process.

In the annexed drawings, forming part of this specification, Figure 1 is a plan view of an apparatus which I prefer to employ in carrying out my invention. Fig. 2 is a vertical section of the same, and Fig. 3 is a detail of the nozzle and pipes through which the dampening agent is discharged into the mass of moving fiber.

In carrying out my invention I provide a receptacle 2, preferably conical in form, arranged vertically between standards 3, with its apex downward, and having a discharge-orifice 4 in its apex and a closed top 5, except for a central air-escape opening 6, that is preferably surrounded by a depending flange 7. A horizontal spout 8 connects tangentially with said conical receptacle near the top and is provided with a blast-fan 9, that connects with a spout 10, through which the shives, woody portions, and all waste material from the flax-break discharge into the spout 8. I prefer to provide a valve 11 in the spout 8, which normally closes a side opening 8' therein, but, as indicated by dotted lines in Fig. 1, may be swung across the spout to close the passage and cause the material from the fan to be discharged through said side opening in case the conical receptacle be oversupplied with material. The current of air rushing through the spout 8, laden with the refuse material from the break, will circle around within the receptacle, carrying the material with it, and finally escape through the opening 6 in the top wall. The shives and other refuse of the flax-straw will settle down to the bottom of the receptacle and pass out through the opening therein. During the time that this air-current is flowing around within the receptacle laden with the refuse from the flax-break I subject the same to treatment by a dampening agent that is admitted through a nozzle 12, arranged in the spout 8 and connected with pipes 13 and 14, having valves 15. One of these pipes is preferably connected with a steam-supply and the other with a pump or reservoir through which oil, preferably petroleum, is supplied under pressure. By means of the valves 15 the steam and petroleum can be admitted simultaneously to the nozzle, preferably in the ratio of ten to one, or either one without the other, and the pressure will be such in the nozzle that the spray will enter the receptacle with considerable velocity and, mingling with the refuse from the flax-break therein, will dampen the same to a sufficient extent to cause cohesion of the particles when subjected to pressure, and the oil absorbed by the shives and woody portions of the flax fiber will greatly increase the combustibility of the same. The volume of material from the break carried into the conical receptacle can be easily regulated, and the amount of steam and oil fed thereto can also be governed according to the character of the material, whether very dry or not, and the degree of combustibility desired. Upon being discharged from the conical receptacle the material falls upon a slatted conveyer 16, that operates over a floor 17, provided within a frame 18. This conveyer and floor extend for a considerable distance to one side of the discharge-orifice in said receptacle, and any material, such as clay or manure, used for a binder or other purposes is placed upon the conveyer at this point to be mixed with the discharge from the receptacle. At the discharge end of said conveyer is a hopper 19, wherein cylinders 20 are arranged parallel with each other and provided with peripheral teeth 21, that are arranged to coact as the cylinders are revolved and mix the material that is fed between them. The cylinders are mounted upon suitable shafts 22, provided with gears 23, one of said shafts having a driven pulley 24. Beneath the cylinder 20 is arranged a screw conveyer 25, one end of which passes through the walls of said hopper and overhangs a hopper 26 of a press 27 of ordinary construction.

I have found that the use of a binder is not absolutely essential to the successful production of artificial fuel from the refuse of a flax-break and may be omitted where manure or clay or other suitable binder material cannot be readily supplied. In such case the shives and other refuse material having been exposed to treatment by the moistening combustible agent will pass directly into the mixing-hopper without the union of any other material therewith.

I claim as my invention—

1. A process of making artificial fuel of vegetable or wood fiber which consists in first subjecting the material while held in suspension by an air-current within a confined area to treatment by a moistening agent, then mixing the product of such treatment and finally compressing it.

2. A process of making artificial fuel of vegetable or wood fiber which consists in first subjecting the material to a blast of a moistening and combustible agent while held in suspension by an air-current within a confined area, and then mixing the product after its discharge from said area and finally compressing the mixture.

3. A process of making artificial fuel of vegetable or wood fiber which consists in first subjecting the material while held in suspension by an air-current within a confined area to treatment by a moistening agent, then mixing a binder with the product of such treatment, and finally compressing the mixture.

4. A process of making artificial fuel of vegetable or wood fiber which consists in first exposing the material to an adhesive, combustible agent while held in suspension by a revolving current of air within a confined area, mixing a binder with the material after its release from the air-current, and finally compressing the mixture.

5. A process of making artificial fuel of the shives and other refuse from a flax-break which consists in first exposing the material while held in suspension within a confined area to a blast of steam and petroleum substantially in the ratio of ten to one, then mixing the product of such treatment, and finally compressing the same.

6. A process of making artificial fuel from the shives and other refuse from a flax-break which consists in first exposing the material to the action of a moistening agent while held in suspension by a revolving current of air within a confined area, then mixing a binder such as manure or clay with the product after its release, and finally compressing the mixture.

In witness whereof I have hereunto set my hand this 20th day of January, 1903.

JOHN T. SMITH.

In presence of—
O. G. HANSON,
SADIE GRIFFIN.